United States Patent [19]

Priddy

[11] 4,195,169
[45] Mar. 25, 1980

[54] DEVOLATILIZING POLYMERS OF STYRENE AND ACRYLIC OR METHACRYLIC ACID

[75] Inventor: Duane B. Priddy, Coleman, Mich.

[73] Assignee: The Dow Chemical Company, Midland, Mich.

[21] Appl. No.: 961,157

[22] Filed: Nov. 16, 1978

Related U.S. Application Data

[63] Continuation of Ser. No. 832,850, Sep. 13, 1977, abandoned.

[51] Int. Cl.$^2$ ............................ C08F 6/10; C08F 6/28
[52] U.S. Cl. ............................ 528/500; 260/32.8 R; 526/317; 528/481; 528/494; 528/495; 528/496; 528/499
[58] Field of Search ............... 528/481, 494, 495, 496, 528/499, 500

[56] References Cited

U.S. PATENT DOCUMENTS

| | | | |
|---|---|---|---|
| 3,035,033 | 5/1962 | Schweitzer et al. | 260/88.1 |
| 3,536,787 | 10/1970 | Street | 528/499 |
| 3,773,740 | 11/1973 | Szabo | 528/499 |

*Primary Examiner*—Stanford M. Levin
*Attorney, Agent, or Firm*—R. B. Ingraham

[57] ABSTRACT

Styrene and acrylic acid or methacrylic acid copolymers can be devolatilized at a temperature above 200° C. and below the decomposition temperature of the copolymer under vacuum in the presence of a monohydric compound such as alcohol or water without significant increase in molecular weight or the formation of undesirable and insoluble gels.

8 Claims, No Drawings

DEVOLATILIZING POLYMERS OF STYRENE AND ACRYLIC OR METHACRYLIC ACID

This is a continuation of application Ser. No. 832,850, filed Sept. 13, 1977, now abandoned.

Molding grade resins of styrene and acrylic acids are known and set forth in U.S. Pat. No. 3,035,033 which describes a solution polymerization process for the preparation of styrene acrylic acid copolymers. By the term "an acrylic acid" is meant an acid of the formula:

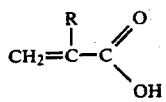

wherein R is hydrogen or methyl. Beneficially, such polymers prepared in a solution polymerization process are recovered by volatilizing the solvent which may be monomer or a mixture of monomer and solvent which is generally unreactive under the conditions of polymerization. It is desirable in devolatilizing such a reaction mixture to employ temperatures as high as possible to cause the solvent to vaporize and it is generally a practice to devolatilize under vacuum. Although most styrene polymers tend to degrade under high temperature conditions, styrene acrylic acid or methacrylic acid copolymers tend to increase in molecular weight and form undesirable insoluble gels when subjected to conventional devolatilizing conditions.

It would be desirable if there were available an improved process for the devolatilization of the styrene acrylic acid resins.

It would also be desirable if there were available an improved process for the devolatilization of styrene acrylic acid and/or methacrylic resins which did not result in undesirable gels.

These benefits and other advantages in accordance with the present invention are achieved in a process for the devolatilization of styrene-(meth)acrylic acid resins wherein a polymer having polymerized therein styrene and an acrylic acid of the formula:

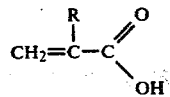

wherein R is hydrogen or methyl, is in intimate admixture with a volatile solvent for the polymerized styrene and an acrylic acid resin, is subjected to devolatilizing conditions at a temperature in excess of about 200° C. and below the decomposition temperature of the resin, the improvement which comprises contacting with the styrene-acid composition to be devolatilized from about 0.1 to about 30 parts by weight per 100 parts by weight of the resin of a monohydric compound of the formula:

ROH wherein R is hydrogen, alkyl, aryl, aralkyl, alkoxy, or polyalkoxy with the further limitation that the —OH group is primary or secondary.

R groups containing up to 40 carbon atoms and mixtures thereof are suitable for the practice of the present invention. Useful compounds include water, methanol, ethanol, isopropyl alcohol, n-propyl alcohol, isobutyl alcohol, n-butyl alcohol, secbutyl alcohol, isoamyl alcohol, n-amyl alcohol, neopentyl alcohol, n-hexyl alcohol, n-octyl alcohol, 2-octyl alcohol, dodecyl alcohol, stearyl alcohol, 2-phenyl ethanol, p-methylbenzyl alcohol, nonyl phenol, dodecyl phenol, 2-methoxy ethanol, 2-ethyoxy ethanol, diethylene glycol monomethyl ether, triethylene glycol monomethyl ether, dipropylene glycol monomethyl ether, triproplyene glycol monomethyl ether, propylene glycol monomethyl ether, nonyl phenol ethoxylates of the formula:

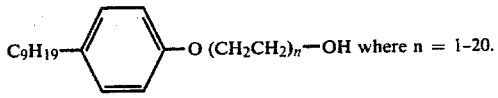

The monohydric compound may be added at any convenient stage in the preparation of the resin either prior to or during its devolatilization. U.S. Pat. No. 3,035,033 discloses the preparation of styrene acrylic acid and styrene methacrylic acid copolymers employing a solution polymerization in a recirculating coil. The teachings of this reference are herewith incorporated by reference thereto. In the U.S. Pat. No. 3,035,033, a recirculating coil is disclosed wherein a feed stream monomer content desirably between 1 and 30 weight parts by weight of the desired acrylic acid or mixtures thereof together with 70 to 99 parts by weight of styrene is passed to a recirculating coil and the coil discharging a polymer solution of polymer in monomer which is subsequently devolatilized and the polymer recovered. The monohydric compound may be admixed with the polymer monomer solution at the exit from the coil or in the event the monohydric compound has no adverse effect upon the polymerization it may be admixed with the monomer feed to the coil. Alternatively the monohydric compound is successfully introduced into the devolatilizer provided the monohydric compound vaporizes under devolatilizing conditions. Beneficially a falling strand devolatilizer or thin film devolatilizer is employed. Suitable devolatilizers are shown in U.S. Pat. Nos. 2,849,430; 2,914,120; 2,970,089; 3,004,900 and 3,149,056, the teachings of which are herewith incorporated by reference thereto. Beneficially, such devolatilizations may be carried out at temperatures from about 200° C. to about 250° C. employing pressures from atmospheric pressure to about 1 millimeter of mercury.

The invention is further illustrated but not limited by the following Examples wherein all parts are parts by weight unless otherwise specified.

EXAMPLE 1

A polymerization apparatus was employed which was a recirculating coil essentially as disclosed in U.S. Pat. No. 3,035,033 with the exception that it was constructed of mild steel. A feed mixture was provided to the coil which consisted of 15 weight percent ethylbenzene, 5.5 percent of acrylic acid, 79.5 percent styrene, 300 parts per million (based on styrene and acrylic acid) of 1,1-bis(t-butyl peroxy)cyclohexane and 10 parts per million of trimethyl phosphite. The feed mixture was fed to the reactor at the rate of one-half reactor volume per hour. When the system had reached steady state, the effluent from the reactor contained 47 weight percent of a polymer of styrene and acrylic acid. The effluent from the reactor was passed continuously through a devolatilizer having a temperature of 240° C. while subjecting the effluent to a pressure of 12 millimeters of mercury. After the reactor had been operating at the steady state, one-half weight percent based on the combined weight of styrene and acrylic acid in the feed stream of tetratriacontyl alcohol was added to the feed stream. Prior to this addition, the reactor effluent stream was sampled. The effluent from the devolatilizer was also sampled. After the addition of the alcohol, the devolatilizer effluent was periodically sampled and molecular weights determined by gel permeation chromatography. The results are set forth in the following table:

| Time (Hrs.) | $\overline{M}_n \times 10^3$ | $\overline{M}_w \times 10^3$ | $\overline{M}_w/\overline{M}_n$ |
| --- | --- | --- | --- |
| Reactor Effluent | 103 ± 3 | 232 ± 6 | 2.2 |
| 0 | 103 ± 3 | 298 ± 6 | 2.9 |
| 1 | 100 ± 3 | 253 ± 6 | 2.5 |
| 1.5 | 94 ± 3 | 244 ± 6 | 2.6 |
| 6 | 92 ± 3 | 226 ± 6 | 2.5 |
| 12 | 90 ± 3 | 211 ± 6 | 2.4 |
| 16 | 90 ± 3 | 216 ± 6 | 2.4 |

$\overline{M}_W$ is weight average molecular weight in molecular weight units.

$\overline{M}_N$ is number average molecular weight in molecular weight units.

"Reactor Effluent" refers to the sample which did not pass through the high temperature devolatilizer. The sample at time "0" represents the polymer from the devolatilizer without the addition of the alcohol. Samples of the polymer taken at 0 and 16 were mixed with separate portions of methyl ethyl ketone. The polymer sample at 16 hours formed a clear solution while the polymer obtained from the sample at 0 contained insoluble gels.

EXAMPLE 2

A stainless steel recirculating reactor similar to that of Example 1 was fed a mixture of 15 weight percent ethylbenzene, 5.5 percent acrylic acid, 79.5 weight percent styrene and 300 parts per million, of 1,1-bis(t-butyl peroxy)cyclohexane (based on the weight of styrene and acrylic acid in the feed stream) at a rate of ⅓ reactor volume per hour. The material within the coil was maintained at a temperature of 125° C. A polymer solution from the reactor was continuously passed through a devolatilizer operating at 250° C. and a pressure of 18 millimeters of mercury. The resultant polymer was only partially soluble in methyl ethyl ketone. Water was introduced to the polymer stream as it entered the devolatilizer at a ratio of 1 part of water to 5 parts of polymer solution. The copolymer obtained was completely soluble in methyl ethyl ketone.

EXAMPLE 3

The procedure of Example 2 was repeated with the exception that water was replaced with n-hexyl alcohol at a ratio of 1 part of alcohol to 10 parts of the polymer containing styrene. The resultant polymer was completely soluble in methyl ethyl ketone.

EXAMPLE 4

The procedure of Example 2 was repeated with the exception that benzyl alcohol was employed instead of water at a ratio of 1 part of alcohol to 10 parts of polymer solution. The copolymer obtained was completely soluble in methyl ethyl ketone.

EXAMPLE 5

The procedure of Example 2 was repeated with the exception that water was replaced with α-methyl benzyl alcohol at a ratio of 0.6 part of alcohol to 10 parts of the polymer solution. The resultant polymer was completely soluble in methyl ethyl ketone.

EXAMPLE 6

The procedure of Example 2 was repeated with the exception that water was replaced with 2-ethylhexanol at a ratio of 0.6 part of alcohol to 10 parts of the polymer solution. The resultant polymer was completely soluble in methyl ethyl ketone.

EXAMPLE 7

The procedure of Example 2 was repeated with the exception that water was replaced with diethyleneglycol monomethyl ether at a ratio of 0.6 part of alcohol to 10 parts of the polymer solution. The resultant polymer was completely soluble in methyl ethyl ketone.

EXAMPLE 8

The apparatus of Example 1 was employed using a feed stream which consisted of 10 weight percent ethylbenzene, 5 weight percent methacrylic acid, 85 weight percent styrene, 250 parts per million (based on the combined weights of styrene and methacrylic acid) of tridecyl phosphite and 300 parts per million of 1,1-bis(t-butyl peroxy)cyclohexane. The reaction mixture was fed at a rate of one-half reactor volume per hour. The reaction was maintained at a temperature of 135° C. When the reaction reached a steady state, the stream contained 50 weight percent of styrene-methacrylic acid copolymer having a number average molecular weight ($M_n$) of 100,000 and a weight average molecular weight ($M_w$) of 230,000. The $M_w/M_n$ ratio was 2.3. After passing the material through the devolatilizer, it operated at a temperature of 225° C. and a pressure of 15 millimeters of mercury, the $M_n$ was 104,000. The $M_w$ was 258,000 and the $M_w/M_n$ was 2.5. A solution of the polymer in methyl ethyl ketone showed visible gels. 0.5 Weight percent stearyl alcohol (based on the combined weight of methacrylic acid and styrene) was added to the feed stream until a steady state condition was reached. The polymer obtained from the devolatilizer had an $M_n$ of 106,000 and an $M_w$ of 236,000. $M_w/M_n$ was 2.2. A solution of the polymer in methyl ethyl ketone was clear and had no gels.

EXAMPLE 9

A styrene acrylic acid copolymer was continuously prepared employing a 73 gallon agitated reactor fitted with a reflux condenser. The feedstream was 5 parts of acrylic acid, 18 parts of ethylbenzene and 77 parts styrene. The stream also contained 450 parts per million of 1,1-bis(t-butyl peroxy) cyclohexane based on the weight of styrene plus acrylic acid. The feedstream was provided to the reactor at the rate of 90 pounds per hour. An inventory of 300 pounds was maintained within the reactor. The reactor agitator was maintained at a speed of 110 revolutions per minute and the pressure within the reactor maintained at about 500 millimeters of mercury. The temperature of the reaction mixture was 138° C. When a steady state was reached, the effluent from the reactor had a solids content of 46 weight percent.

The effluent from the reactor was then passed to a single-stage falling stream devolatilizer, that is, a generally vertically disposed vessel having a polymer inlet at the central portion of its top, polymer discharge at the bottom, and a conduit to remove vapor therefrom. The devolatilizer was operated under a pressure of 10 millimeters of mercury. A polymer heater disposed generally at the polymer inlet was maintained at 250° C. and the jacket of the devolatilizer maintained at a temperature of 230° C. The stream feeding the devolatilizer was sampled and the weight average molecular weight determined by gel permeation chromatography. The molecular weight was indicated to be 190,000 weight average. The polymer exhibited no gels. The stream of polymer from the devolatilizer was sampled and molecular weight determined by gel permeation chromatography. The molecular weight was 295,000 and gels were present in the polymer. Water, at the rate of 7 pounds per hour, was pumped into the devolatilizer at a location remote from the vacuum port. On addition of the water to the devolatilizer the water turned to vapor and the pressure therein increased from about 10 millimeters of mercury to about 30 millimeters of mercury. The effluent from the devolatilizer was sampled after a sufficient length of time had passed to at least approach equilibrium in the devolatilizer and molecular weight determined by gel chromatography. The molecular weight was 216,000 weight average and the polymer showed no gels.

Similar beneficial results are obtained when the hereinbefore delineated monohydric compounds are employed with styrene-acrylic acid or styrene-methacrylic acid streams during devolatilization.

As is apparent from the foregoing application, the present invention is susceptible of being embodied with various alterations and modifications which may differ particularly from those that have been described in the preceding specification and description. For this reason, it is to be fully understood that all of the foregoing is intended to be merely illustrative and is not to be construed or interpreted as being restrictive or otherwise limiting of the present invention, excepting as it is set forth and defined in the hereto appended claims.

What is claimed is:

1. A process for the devolatilization of styrene-acrylic acid or styrene-methacrylic acid resins which form gels when subjected to devolatilization at a temperature in excess of about 200° C. and below the decomposition temperature of the polymer, the resin being a polymer of a monomer mixture of from about 1 to 30 parts by weight of acrylic acid or methacrylic acid and 99 to 70 parts by weight of styrene wherein a polymer having polymerized therein styrene and acrylic or methacrylic acid is in intimate admixture with a volatile solvent for the styrene and acrylic acid or methacrylic acid polymer, is subjected to devolatilization the improvement which comprises contacting the styrene-acrylic acid or methacrylic acid polymer containing a volatile solvent to be devolatilized, with from about 0.1 to about 30 parts by weight per 100 parts by weight of the polymer of a monohydric compound of the formula:

ROH wherein R is hydrogen, alkyl, aryl, aralkyl, alkaryl, alkoxy or polyalkoxy, such groups containing up to 40 carbon atoms and mixtures thereof with the further limitation that the —OH group is primary or secondary.

2. The method of claim 1 including the step of polymerizing a stream of styrene and acrylic acid or methacrylic acid containing the monohydric compound.

3. The method of claim 1 wherein the monohydric compound is mixed with the polymer immediately prior to devolatilization.

4. The method of claim 2 wherein the monohydric compound is water.

5. The method of claim 2 wherein water vapor is contacted with the stream during devolatilization.

6. A process for the devolatilization of styrene-acrylic acid or methacrylic acid resins which form gels when subjected to devolatilization at a temperature in excess of about 200° C. and below the decomposition temperature of the polymer, the resin being a polymer of a monomer mixture of from about 1 to 30 parts by weight of acrylic acid or methacrylic acid and 99 to 70 parts by weight of styrene wherein a polymer having polymerized therein styrene and acrylic acid or methacrylic acid is in intimate admixture with a volatile solvent for the styrene and acrylic acid or methacrylic acid polymer, subjected to devolatilizing conditions, the improvement which comprises contacting the styrene-acrylic acid or methacrylic acid polymer containing a volatile solvent to be devolatilized with from about 0.1 to about 30 parts by weight per 100 parts by weight of the polymer of a monohydric compound of the formula:

ROH wherein R is alkyl, aryl, aralkyl, alkaryl, alkoxy or polyalkoxy, such groups containing up to 40 carbon atoms and mixtures thereof with the further limitation that the —OH group is primary or secondary.

7. The method of claim 6 including the step of polymerizing a stream of styrene and acrylic acid or methacrylic acid containing the monohydric compound.

8. The method of claim 6 wherein the monohydric compound is mixed with the polymer immediately prior to devolatilization.

* * * * *